United States Patent
Yoshiura et al.

(10) Patent No.: US 9,923,499 B2
(45) Date of Patent: Mar. 20, 2018

(54) MOTOR CONTROL DEVICE AND MOTOR CONTROL METHOD

(71) Applicant: Kabushiki Kaisha Yaskawa Denki, Kitakyushu-shi (JP)

(72) Inventors: Yasufumi Yoshiura, Kitakyushu (JP); Yasuhiko Kaku, Kitakyushu (JP)

(73) Assignee: KABUSHIKI KAISHA YASKAWA DENKI, Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/298,154

(22) Filed: Oct. 19, 2016

(65) Prior Publication Data

US 2017/0040916 A1 Feb. 9, 2017

Related U.S. Application Data

(63) Continuation of application No. PCT/JP2014/077269, filed on Oct. 10, 2014.

(51) Int. Cl.
| G05B 13/00 | (2006.01) |
| B23Q 35/00 | (2006.01) |
| H02P 7/00 | (2016.01) |
| H02P 29/00 | (2016.01) |
| H02P 23/14 | (2006.01) |

(Continued)

(52) U.S. Cl.
CPC ............ *H02P 7/00* (2013.01); *H02P 21/143* (2013.01); *H02P 23/14* (2013.01); *H02P 29/00* (2013.01); *G05B 19/404* (2013.01)

(58) Field of Classification Search
None
See application file for complete search history.

(56) References Cited

U.S. PATENT DOCUMENTS 5,598,077 A * 1/1997 Matsubara ........... G05B 19/404
                                                          318/568.22
2007/0210731 A1* 9/2007 Yoshiura .............. G05B 19/404
                                                          318/163

FOREIGN PATENT DOCUMENTS

| JP | H02-123984 A | 5/1990 |
| JP | H06-284763 A | 10/1994 |
| JP | H10-295092 A | 11/1998 |

(Continued)

OTHER PUBLICATIONS

English translation of the International Search Report for PCT/JP2014/077269.

*Primary Examiner* — Bentsu Ro
*Assistant Examiner* — Zemenay Truneh
(74) *Attorney, Agent, or Firm* — Hubbs, Enatsky & Inoue PLLC

(57) ABSTRACT

Provided is a motor control device, including an acceleration command calculation unit configured to calculate an acceleration command directed to a motor, a torque command calculation unit configured to calculate a torque command directed to the motor based on the acceleration command and a predetermined moment-of-inertia value, a torque correction value calculation unit configured to estimate disturbance of the motor based on the torque command and at least one of a motor position or a motor speed, to thereby calculate a torque correction value for the torque command, and a moment-of-inertia value change unit configured to change the predetermined moment-of-inertia value based on an estimated moment-of-inertia ratio, which is a ratio of the torque correction value to the torque command.

11 Claims, 8 Drawing Sheets

(51) Int. Cl.
*H02P 21/14* (2016.01)
*G05B 19/404* (2006.01)

(56) References Cited

FOREIGN PATENT DOCUMENTS

| | | |
|---|---|---|
| JP | 2000-020104 A | 1/2000 |
| JP | 2010-142020 A | 6/2010 |
| JP | 2013-118817 A | 6/2013 |
| WO | 2005093939 A1 | 10/2005 |

* cited by examiner

FIG.3
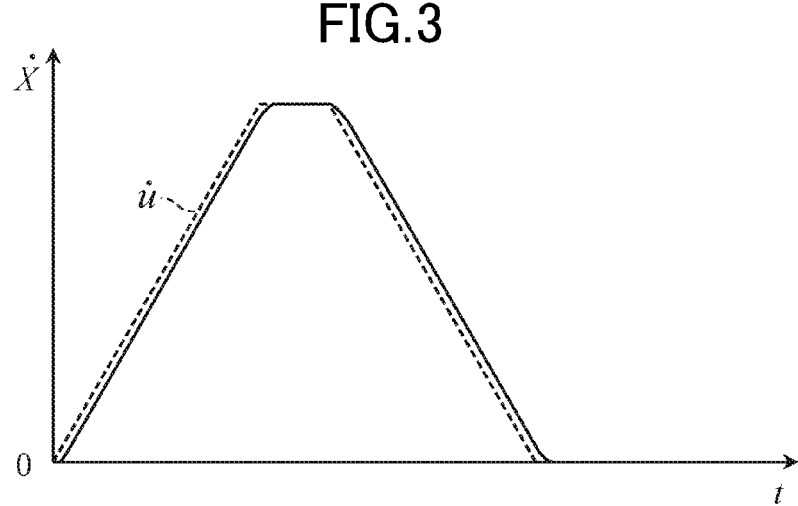
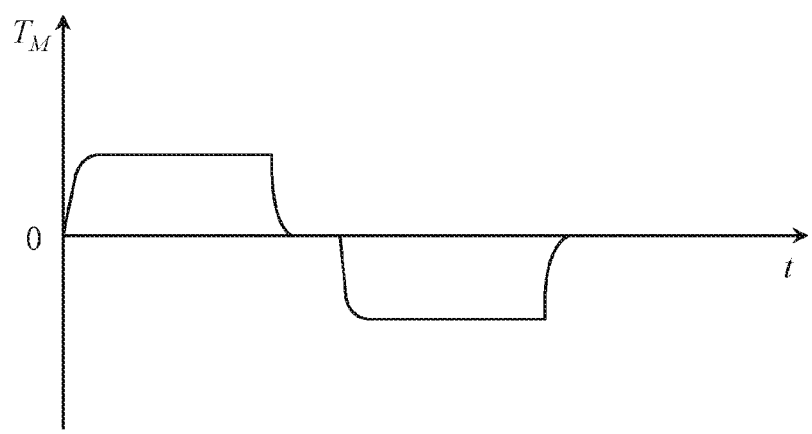
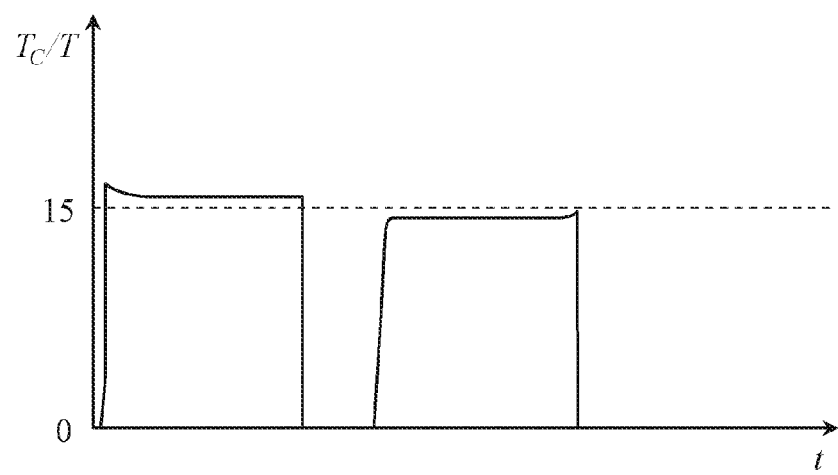

FIG.4
RELATED ART
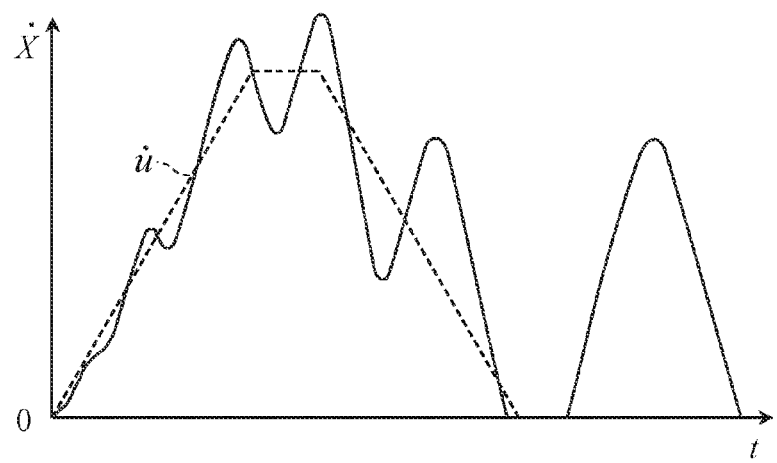
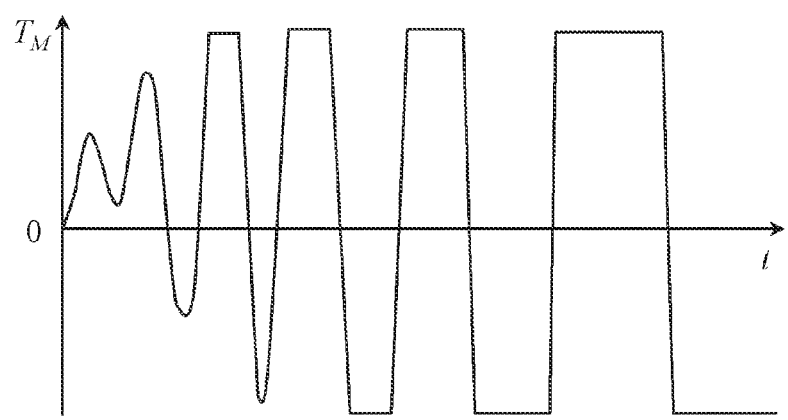
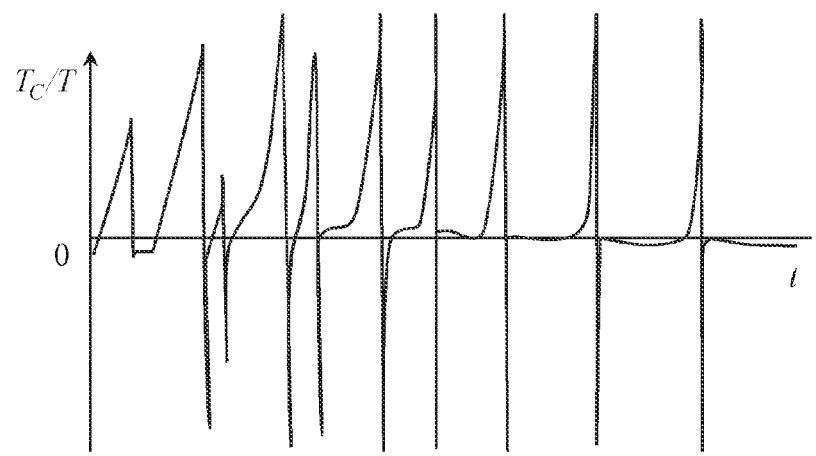

FIG.5
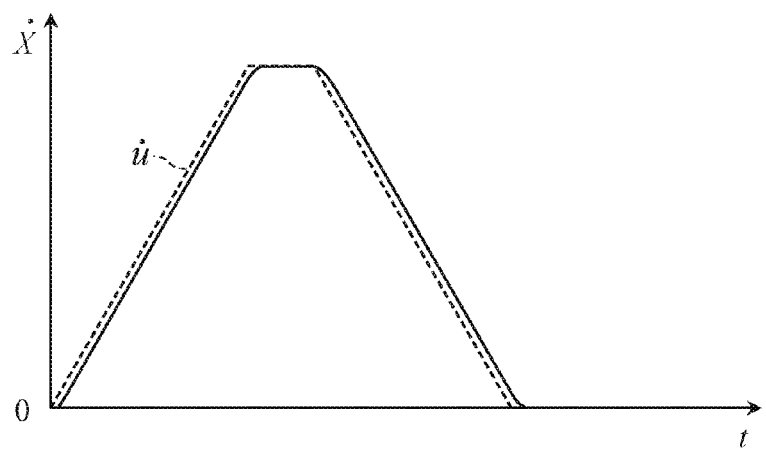
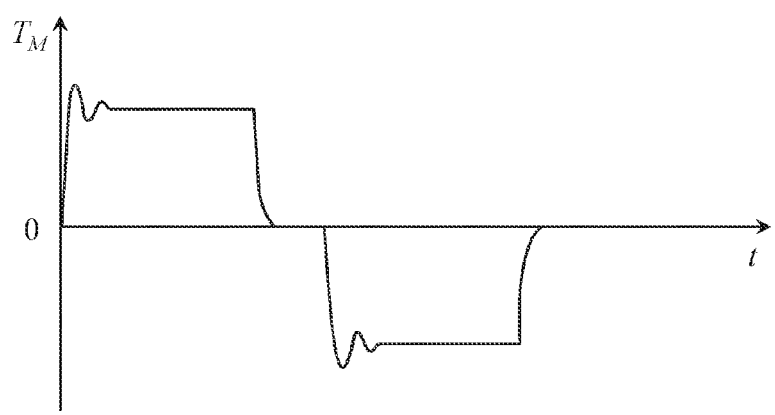
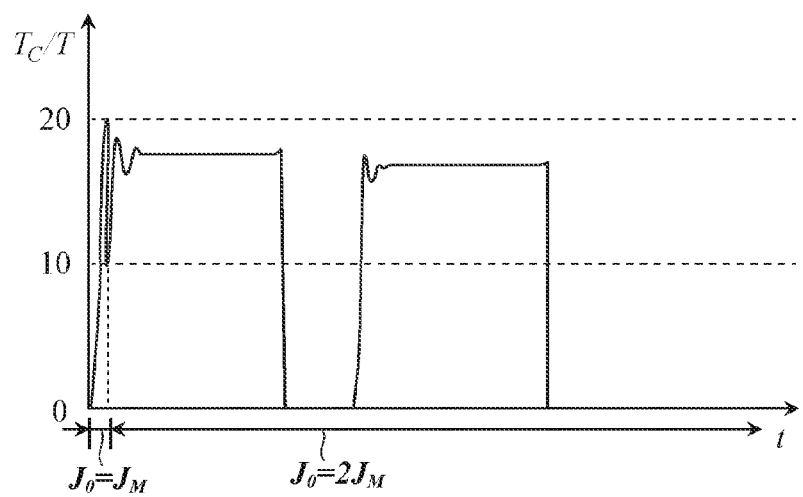

FIG.6
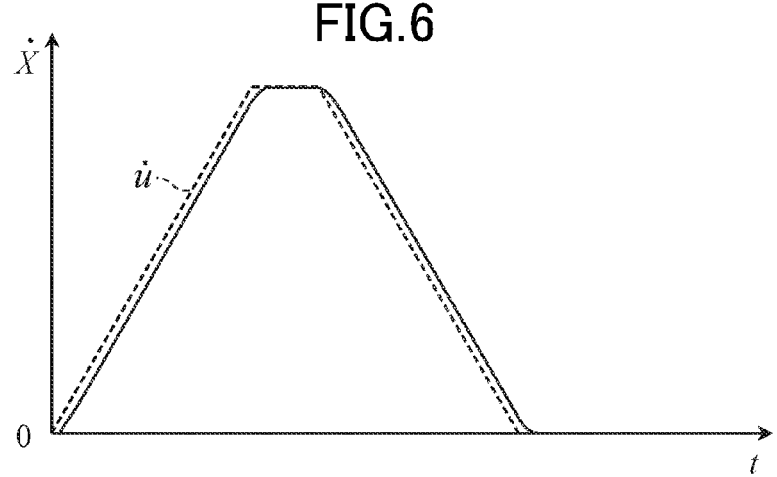
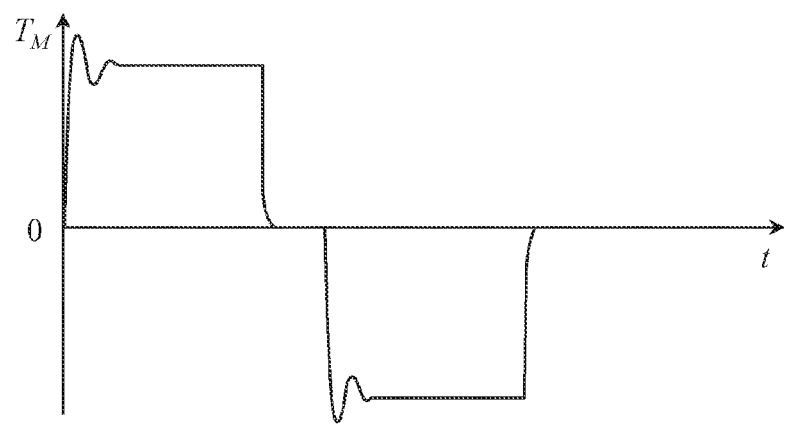
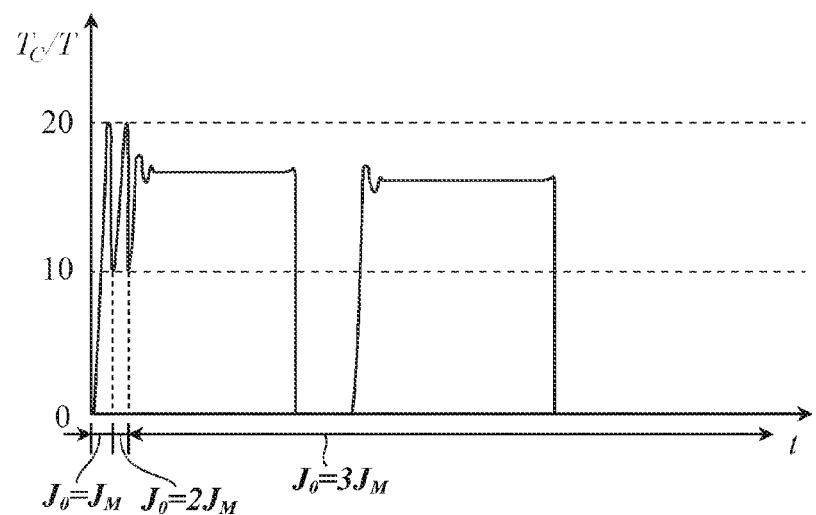

MOTOR CONTROL DEVICE AND MOTOR CONTROL METHOD

CROSS-REFERENCE TO RELATED APPLICATION

The present disclosure contains subject matter related to that disclosed in Priority Patent Application under Patent Cooperation Treaty PCT/JP2014/077269 filed in the Japan Patent Office on Oct. 10, 2014, the entire contents of which are hereby incorporated by reference.

BACKGROUND OF THE INVENTION

Field of the Invention

The present invention relates to a motor control device and a motor control method.

Description of the Related Art

In WO 2005/093939 A1, there is described a motor control device including a phase compensation unit including a disturbance observer and a phase advance filter. In WO 2005/093939 A1, there is described such a fact that compensation is carried out for zero to 30 times of a moment-of-inertia ratio, which is a ratio between a value of a moment of inertia used by the motor control device and a true value thereof, to thereby stabilize a control system and maintain a response constant regardless of a load.

SUMMARY OF THE INVENTION

According to one embodiment of the present invention, a motor control device includes: an acceleration command calculation unit configured to calculate an acceleration command directed to a motor; a torque command calculation unit configured to calculate a torque command directed to the motor based on the acceleration command and a predetermined moment-of-inertia value; a torque correction value calculation unit configured to estimate disturbance of the motor based on the torque command and at least one of a motor position or a motor speed, to thereby calculate a torque correction value for the torque command; and a moment-of-inertia value change unit configured to change the predetermined moment-of-inertia value based on an estimated moment-of-inertia ratio, which is a ratio of the torque correction value to the torque command.

Further, according to another embodiment of the present invention, a motor control method includes: calculating an acceleration command directed to a motor; calculating a torque command directed to the motor based on the acceleration command and a predetermined moment-of-inertia value; estimating disturbance of the motor based on the torque command and at least one of a motor position or a motor speed, thereby calculating a torque correction value for the torque command; and changing the predetermined moment-of-inertia value based on an estimated moment-of-inertia ratio, which is a ratio of the torque correction value to the torque command.

BRIEF DESCRIPTION OF THE DRAWINGS

FIG. 3 is a graph for showing an example of an operation of the motor control device according to the first embodiment of the present invention when a value of a moment-of-inertia ratio $J_P/J_0$ is 15.

FIG. 4 is a graph for showing an example of the operation of the motor control device according to the related art when the value of the moment-of-inertia ratio $J_P/J_0$ is 35.

FIG. 5 is a graph for showing an example of the operation of the motor control device according to the first embodiment of the present invention when the value of the moment-of-inertia ratio $J_P/J_0$ is 35.

FIG. 6 is a graph for showing an example of the operation of the motor control device according to the first embodiment of the present invention when the value of the moment-of-inertia ratio $J_P/J_0$ is 50.

DESCRIPTION OF THE EMBODIMENTS

From a point of view of the inventors of the present invention, in general, in order to convert an acceleration command value into a torque command value for a motor in the motor control, a value of the moment of inertia of the motor itself and a load connected to the motor is necessary. When the value of the moment of inertia is significantly different from a true value, a control system becomes unstable. However, it is generally difficult to accurately acquire the value of the moment of inertia, and the value may change during drive of the motor.

To address this problem, control of carrying out an operation of automatically acquiring the value of the moment of inertia is well known as so-called moment-of-inertia identification, but a special operation is necessary for the identification in this technology, and it is also difficult to handle change of the moment of inertia during operation. Thus, as described before, there is proposed a technology of adding robustness to the control system such that the control system is stabilized even when the value of the moment of inertia is different from the true value to a considerable degree, but an extent of the moment-of-inertia ratio that can be compensated has an upper limit even in this technology.

As a result of extensive study and development of easily stabilizing the control system regardless of the moment-of-inertia ratio in the motor control, thereby acquiring a response regardless of the load, the inventors of the present invention have arrived at a novel and original motor control device. In the following, a detailed description is given of this motor control device by means of embodiments.

Figure 1:
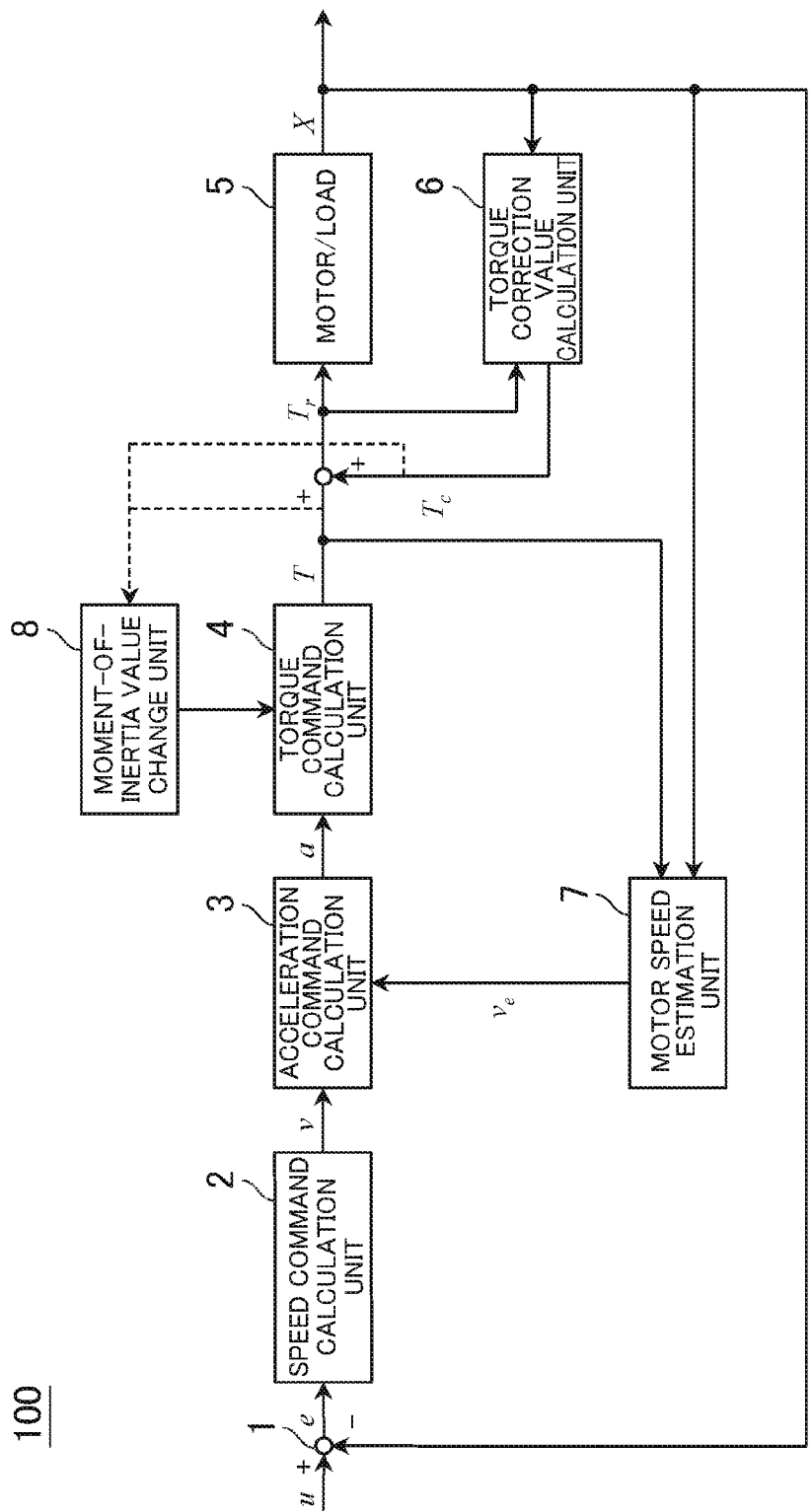
FIG. 1 is a control block diagram for illustrating a motor control device according to a first embodiment of the present invention.

FIG. 1 is a control block diagram for illustrating a motor control device 100 according to a first embodiment of the present invention. On this occasion, the motor control device is a device constructed by integrating an amplifier configured to supply electric power for operating a servomotor and an inverter, and a control circuit configured to control a current and a voltage output from the amplifier and the like. Currently, the control in the motor control device is discrete control (so-called digital control) by a digital processor in many cases, and control blocks illustrated in FIG. 1 do not always represent electric circuits that physically exist, and include control blocks whose functions are achieved by software executed on the digital processor.

According to the first embodiment, the motor control device 100 is configured to input a position command u as control input, and to output a position X of a control subject as control output.

In the motor control device 100, the current position X of a load 5, namely, the motor, and machine components mounted to the motor, is subtracted from the position command u, resulting in a deviation e at a node 1. Subsequently, the deviation e is converted into a speed command v by a speed command calculation unit 2. Further, the speed command v is converted into an acceleration command a by an acceleration command calculation unit 3. Further, the acceleration command a is multiplied by a moment-of-inertia value $J_0$ so as to be converted into a torque command T in a torque command calculation unit 4.

In general motor control, this torque command T is input to the motor/load 5, and current/voltage control is carried out by the inverter or the like, thereby driving the motor. According to the embodiment, a corrected torque command $T_r$ is acquired by adding a torque correction value $T_c$ output from a torque correction value calculation unit 6 to the torque command T. This corrected torque command $T_r$ is input to the motor/load 5.

The torque correction value calculation unit 6 is a disturbance observer designed as a state observer into which a model (nominal model) receiving disturbance is built. In an example described later, the torque correction value calculation unit 6 includes a current loop model, an inverse system of a nominal model, and a low-pass filter.

Moreover, a motor speed estimation unit 7 is configured to function as a speed observer configured to estimate the motor speed, and simultaneously serve as a phase compensator configured to advance the phase. An acquired estimated motor speed $v_e$ is input to the acceleration command calculation unit 3, thereby constructing a speed feedback loop and advancing the phase in this loop, resulting in an improvement in the phase margin and a stabilized response.

Moreover, in the motor control device 100 according to this embodiment, with the operations of the torque correction value calculation unit 6 and the motor speed estimation unit 7, the control system can be stabilized, and desired performance of tracking the position command u can be provided, even when an actual moment of inertia $J_P$ of the motor/load 5 and the moment-of-inertia value $J_0$ used in the torque command calculation unit 4 do not accurately match each other. On this occasion, a range of a value of a moment-of-inertia ratio $J_P/J_0$ being a ratio of the actual moment of inertia $J_P$ to the moment-of-inertia value $J_0$ in which the control system is stable and the desired tracking performance is provided, is 0 to 30 as described in BACKGROUND OF THE INVENTION.

In the motor control device 100 according to this embodiment, the motor speed is estimated, and the phase is compensated by using the motor speed estimation unit 7 in the speed feedback loop, but the phase compensation does not always need to be carried out, and the motor speed may be directly acquired by differentiating the current position X being the output of the motor/load 5, in place of the estimation of the motor speed. In this case, influence of disturbance including the mismatch between the moment-of-inertia value $J_0$ and the actual moment of inertia $J_P$ tends to be exerted, and the phase margin is not provided. Thus, the range of the value of the moment-of-inertia ratio $J_P/J_0$ in which the control system is stable and the desired tracking performance is provided decreases.

Further, a moment-of-inertia value change unit 8 is provided, and is configured to change the moment-of-inertia value $J_0$ used in the torque command calculation unit 4 based on the ratio between the torque correction value $T_c$ and the torque command T, thereby stabilizing the control system and providing the desired tracking performance regardless of the value of the actual moment of inertia $J_P$.

Figure 2:
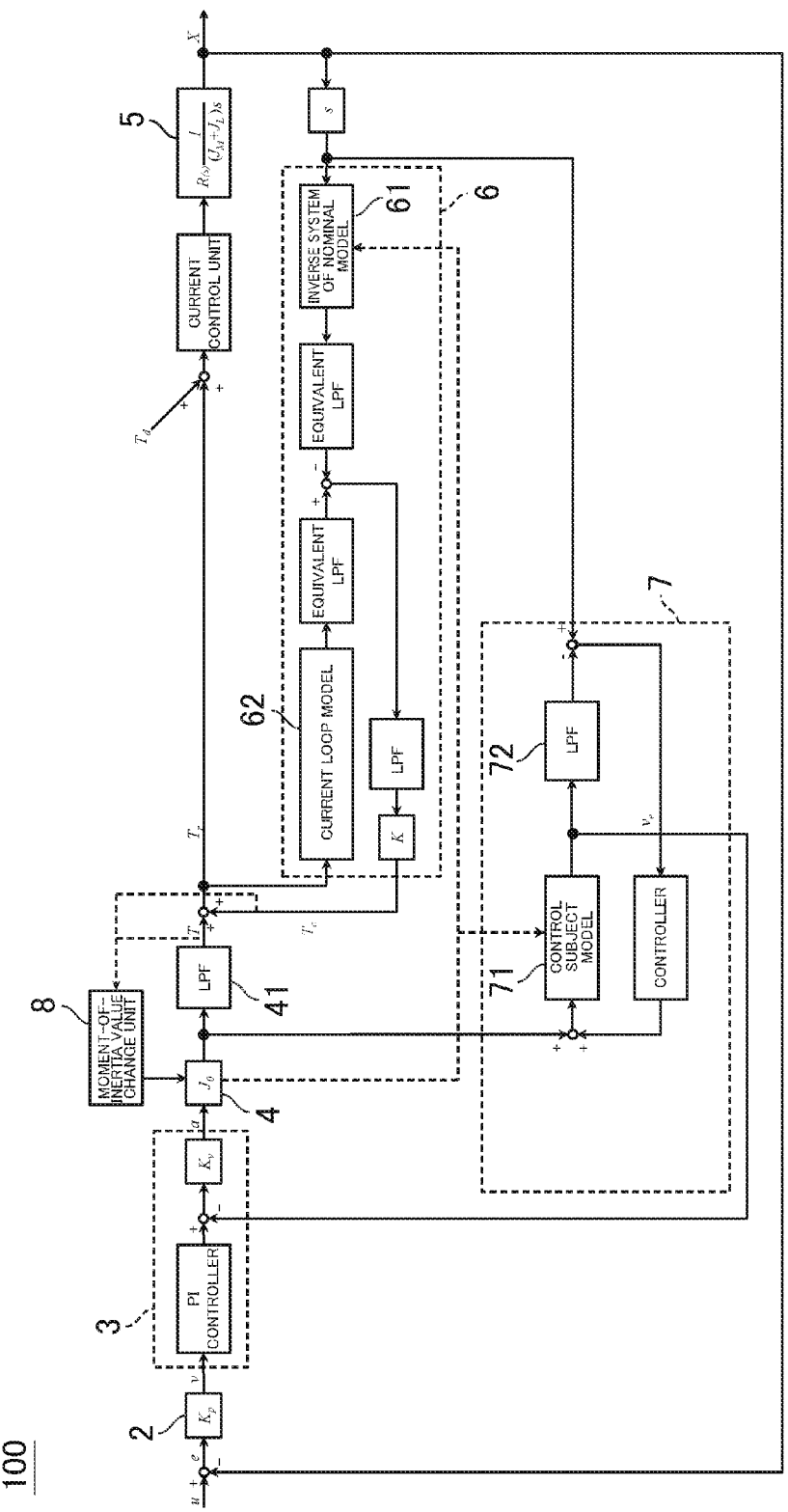
FIG. 2 is a diagram for illustrating, in more detail, control blocks of the motor control device according to the first embodiment of the present invention.

FIG. 2 is a diagram for illustrating, in more detail, control blocks of the motor control device 100 according to the first embodiment of the present invention. The illustrated control blocks are examples for embodying the control blocks illustrated in FIG. 1, and it is not intended that the control blocks illustrated in FIG. 1 be limited to the control blocks illustrated in FIG. 2.

As illustrated, the torque command calculation unit 4 is configured to multiply the acceleration command a by the moment-of-inertia value $J_0$. Moreover, a low-pass filter 41 is inserted on a subsequent stage of the torque command calculation unit 4.

The motor/load 5 includes a control subject including a moment of inertia $J_M$ of the motor and a moment of inertia $J_L$ of the load connected to the motor. On this occasion, as an example of the control subject, a product of R(s) being a mechanical resonance system, and $1/(J_M+J_L)s$ being a mechanical rigid body system, is exemplified. Moreover, a current control unit including an inverter or the like, which is configured to convert the corrected torque command $T_r$ into a current is provided on a preceding stage of the motor/load 5. Moreover, a disturbance torque $T_d$ is acting on the motor/load 5, and is described as a disturbance to the corrected torque command $T_r$. The moment-of-inertia value $J_0$ used in the torque command calculation unit 4 is ideally and preferably a moment-of-inertia value acquired by combining the moment of inertia $J_M$ of the motor and the moment of inertia $J_L$ of the load connected to the motor, which are included in the control subject, but those moments of inertia, particularly the moment of inertia $J_L$ of the load, are difficult to be acquired in advance. Therefore, in the motor control device 100 according to this embodiment, as an initial value of the moment-of-inertia value $J_0$, the value of the moment of inertia $J_M$ of the motor or a value generally close to the value of the moment of inertia $J_M$ of the motor is used.

The torque correction value calculation unit 6 is the disturbance observer configured to calculate a difference between an estimated actual torque, which is estimated from the current position X by using an inverse system 61 of a nominal model of the control subject, and a command torque, which is calculated from the corrected torque command $T_r$ by using a current loop model 62, thereby estimating the disturbance torque. The torque correction value calculation unit 6 is configured to output the torque correction value $T_c$ for compensating the disturbance torque. A low-pass filter for stabilizing an operation is appropriately used in the torque correction value calculation unit 6. On this occasion, the torque command T reflects the moment-of-inertia value $J_0$ used in the torque command calculation unit 4, and the torque correction value $T_c$ reflects the actual moment of inertia $J_P$. The ratio $T_c/T$ of those values is thus approximately equal to the moment-of-inertia ratio $J_P/J_0$. In the following, the value $T_c/T$ is referred to as estimated moment-of-inertia ratio. The estimated actual torque may be estimated not from the current position X, but from a motor speed $\dot{X}$.

The motor speed estimation unit 7 is constructed as a loop including a control subject model 71 and a low-pass filter 72, and is configured to use the control subject model 71 to estimate the motor speed, and to extract the estimated motor speed $v_e$ from a preceding stage of the low-pass filter 72, thereby applying the speed feedback advanced in phase to the acceleration command calculation unit 3. This configuration improves the phase margin in the speed feedback loop as described before.

When the moment-of-inertia value change unit 8 changes the moment-of-inertia value $J_0$ of the torque command calculation unit 4, and the inverse system 61 of the nominal model of the torque correction value calculation unit 6 and the control subject model 71 of the motor speed estimation unit 7 use the moment-of-inertia value $J_0$, the moment-of-inertia value $J_0$ used in the inverse system 61 of the nominal model and the control subject model 71 is also changed.

FIG. 3 is a graph for showing an example of the operation of the motor control device 100 according to this embodiment when the value of the moment-of-inertia ratio $J_P/J_0$ is 15. This graph plots the motor speed $\dot{X}$, the motor torque $T_M$, and the estimated moment-of-inertia ratio $T_c/T$ with respect to time t from a top row in this order.

On the top row of FIG. 3, a speed command ú (time derivative of the position command u) is indicated by the broken line, and it is recognized that the motor speed $\dot{X}$ indicated by the solid line is provided so as to approximately track the speed command ú. Moreover, as shown on a middle row of FIG. 3, the motor torque $T_M$ presents a stable value respectively during acceleration and deceleration. Further, as shown on a bottom row of FIG. 3, the estimated moment-of-inertia ratio $T_c/T$ presents a value including more or less deviations respectively during the acceleration and the deceleration, but generally close to 15 being the value of the moment-of-inertia $J_P/J_0$. This fact indicates that the estimated moment-of-inertia ratio $T_c/T$ can be used as the estimated value of the moment-of-inertia ratio $J_P/J_0$.

In contrast, FIG. 4 is a graph for showing an example of the operation of the motor control device according to the related art when the value of the moment-of-inertia ratio $J_P/J_0$ is 35. The related-art motor control device used in this example is assumed to be the same in the configuration as the motor control device 100 except that the moment-of-inertia value change unit 8 included in the motor control device 100 according to the embodiment is not provided.

As apparent from a top row of FIG. 4, the motor speed $\dot{X}$ fluctuates without being able to track the speed command ú, and the control system has lost stability in this example. It is apparent that the desired tracking performance is not provided in this state. This is because the value of the moment-of-inertia ratio $J_P/J_0$ exceeds a compensable range provided by a disturbance observer (torque correction value calculation unit 6 according to this embodiment) and a phase compensation unit (motor speed estimation unit 7 according to this embodiment), and the control system no longer can track the disturbance. As shown on a middle row of FIG. 4, the motor torque $T_M$ also fluctuates, and a waveform is truncated due to a torque limit of the motor. As shown on a bottom row of FIG. 4, the estimated moment-of-inertia ratio $T_c/T$ also significantly fluctuates in the value, and the value of the moment-of-inertia ratio $J_P/J_0$ can no longer be estimated after the control system has lost the stability. In FIG. 4, the scales on the vertical axes in the plots of the motor torque $T_M$ shown on the middle row and the estimated moment-of-inertia ratio $T_c/T$ shown on the bottom row are not the same as those of FIG. 3.

FIG. 5 is a graph for showing an example of the operation of the motor control device 100 according to this embodiment when the value of the moment-of-inertia ratio $J_P/J_0$ is 35 similarly to FIG. 4. In the motor control device 100, as in the case shown in FIG. 3, as shown on a top row of FIG. 5, the motor speed $\dot{X}$ generally tracks the speed command ú, and as shown on a middle row of FIG. 5, the motor torque $T_M$ quickly converges to stable values respectively during the acceleration and the deceleration. Thus, it is recognized that the control system is stable, and the desired tracking performance is provided.

On this occasion, as shown on a bottom row of FIG. 5, the value of the estimated moment-of-inertia ratio $T_c/T$ quickly increases simultaneously with the start of the acceleration of the motor. On this occasion, the moment-of-inertia value change unit 8 of the motor control device 100 is configured to monitor the value of the estimated moment-of-inertia ratio $T_c/T$, and to stepwise change the moment-of-inertia value $J_0$ used by the torque command calculation unit 4 when the value of the estimated moment-of-inertia ratio $T_c/T$ becomes more than a predetermined value (referred to as increase-time threshold ratio). On this occasion, the motor control device 100 can provide the stable control up to approximately 25 to 30 of the value of the moment-of-inertia ratio $J_P/J_0$ estimated based on the estimated moment-of-inertia ratio $T_c/T$, and the increase-time threshold ratio is thus set to 20 for allowing a margin. Moreover, an initial value of the moment-of-inertia value $J_0$ is the moment of inertia $J_M$ of the motor.

As a result, $J_0$ is $J_M$ at the start of the acceleration of the motor, and when the estimated moment-of-inertia ratio $T_c/T$ becomes more than 20, $J_M$ is added to $J_0$, and the $J_0$ thus becomes $2J_M$. As a result, $J_0$ increases by two times, and the estimated moment-of-inertia ratio $T_c/T$ decreases by a half. Then, the estimated moment-of-inertia ratio $T_c/T$ generally stabilizes in a vicinity of 17.5. This corresponds to the fact that the moment-of-inertia ratio becomes $J_P/2J_M=17.5$ after the moment-of-inertia value $J_0$ is updated. Below the bottom row of FIG. 5, the moment-of-inertia value $J_0$ is also shown.

In this way, the motor control unit 100 always maintains the moment-of-inertia ratio $J_P/J_0$ equal to or less than 25 to 30 regardless of the value of the actual moment of inertia $J_P$, thereby providing the stability of the control and the desired tracking performance.

FIG. 6 is a graph for showing an example of the operation of the motor control device 100 according to this embodiment when the value of the moment-of-inertia ratio $J_P/J_0$ is 50. As shown on a top row of FIG. 6, also in this case, as in the case shown in FIG. 3, the motor speed generally tracks the speed command ú, and as shown on a middle row of FIG. 6, the motor torque $T_M$ quickly converges to stable values respectively during the acceleration and the deceleration. Thus, it is recognized that the control system is stable, and the desired tracking performance is provided.

The value of the estimated moment-of-inertia ratio $T_c/T$ is shown on a bottom row of FIG. 6, and first increases in the state where the moment-of-inertia value $J_0$ is $J_M$ being the initial value. When the value of the estimated moment-of-inertia ratio $T_c/T$ becomes more than the increase-time threshold ratio 20, $J_M$ is added to the moment-of-inertia value $J_0$ by the moment-of-inertia value change unit 8, and $J_0$ is thus changed to $2J_M$. When the value of the estimated moment-of-inertia ratio $T_c/T$ further increases, and again becomes more than the increase-time threshold ratio 20, $J_M$ is similarly added to the moment-of-inertia value $J_0$ by the moment-of-inertia value change unit 8, and $J_0$ is thus changed to $3J_M$. As a result, the value of the estimated moment-of-inertia ratio $T_c/T$ generally stabilizes in a vicinity of 16.7. This corresponds to the fact that the moment-of-inertia ratio after the update becomes $J_P/3J_M=16.7$. Below the bottom row of FIG. 6, the moment-of-inertia value $J_0$ is also shown.

As described before, in the motor control device 100, each time the value of the estimated moment-of-inertia ratio $T_c/T$ exceeds the predetermined increase-time threshold ratio, the moment-of-inertia value $J_0$ is stepwise changed, that is, is stepwise increased, by the moment-of-inertia value change unit 8. As a result, the moment-of-inertia ratio $J_P/J_0$ estimated based on the estimated moment-of-inertia ratio $T_c/T$ can be maintained to be equal to or less than the predetermined value. Thus, the control system can be stabilized, and the desired tracking performance is provided. On this occasion, the increase-time threshold ratio can appropriately be set depending on the margin of the moment-of-inertia ratio $J_P/J_0$ in which the control system is stabilized, and the initial value of the moment-of-inertia value $J_0$ and the step for increasing the moment-of-inertia value $J_0$ are arbitrary. The moment of inertia $J_M$ of the motor is not always required to be used unlike this embodiment. The moment-of-inertia value $J_0$ may be increased to a constant multiple thereof (for example, by multiplying by two).

Further, the moment-of-inertia value change unit 8 is configured to stepwise change the moment-of-inertia value $J_0$ based on the estimated moment-of-inertia ratio $T_c/T$, but may be configured to continuously change the moment-of-inertia value $J_0$. However, the frequent change in the moment-of-inertia value $J_0$ may conversely spoil the stability of the control system, and also increase a load imposed by information processing. Therefore, as disclosed in the embodiment, the configuration of stepwise changing the moment-of-inertia value $J_0$ is preferred. Moreover, in order to reduce influence of noise, the moment-of-inertia value change unit 8 is preferably configured to change the moment-of-inertia value $J_0$ based on a value acquired by applying an arbitrary low-pass filter, i.e., a first-order lag filter, to the value of the estimated moment-of-inertia ratio $T_c/T$. A time constant on this occasion is set to such a value as to enable the tracking of a change in the value of the estimated moment-of-inertia ratio $T_c/T$.

Further, the moment-of-inertia value change unit 8 is configured to only stepwise increase the moment-of-inertia value $J_0$ in the description given above, but may be configured to additionally stepwise decrease the moment-of-inertia value $J_0$. This configuration is provided assuming a case where, for example, the load connected to the motor is an arm for carrying a parcel or the like, thus, the arm is accompanied by a change in the load, and the actual value of the moment of inertia $J_P$ significantly decreases when the arm changes from a state where the parcel is gripped to a state where the parcel is released, resulting in an extremely small value of the moment-of-inertia ratio $J_P/J_0$.

Thus, the moment-of-inertia value change unit 8 may be configured to stepwise decrease the moment-of-inertia value $J_0$ used in the torque command calculation unit 4 when the value of the estimated moment-of-inertia ratio $T_c/T$ becomes less than a predetermined value (referred to as decrease-time threshold ratio). On this occasion, the decrease-time threshold ratio is preferably different from the increase-time threshold ratio, and is particularly preferably sufficiently less than the increase-time threshold ratio. This is for preventing the moment-of-inertia value $J_0$ from frequently repeating the increase and the decrease when the value of the estimated moment-of-inertia ratio $T_c/T$ fluctuates due to noise or the like, resulting in spoiling the stability of the control system. On this occasion, the control system is designed to be stabilized when the actual moment of inertia $J_P$ is equal to the moment of inertia $J_M$ of the motor (that is, in a state of no load), and, for example, 1 can thus be selected as the decrease-time threshold ratio. In other words, the moment-of-inertia value change unit 8 is configured to start subtracting $J_M$ from the moment-of-inertia value $J_0$ when the value of the estimated moment-of-inertia ratio $T_c/T$ becomes less than 1 being the decrease-time threshold ratio, and to repeat the subtraction until the moment-of-inertia value $J_0$ reaches $J_M$ being the initial value.

Figure 7:
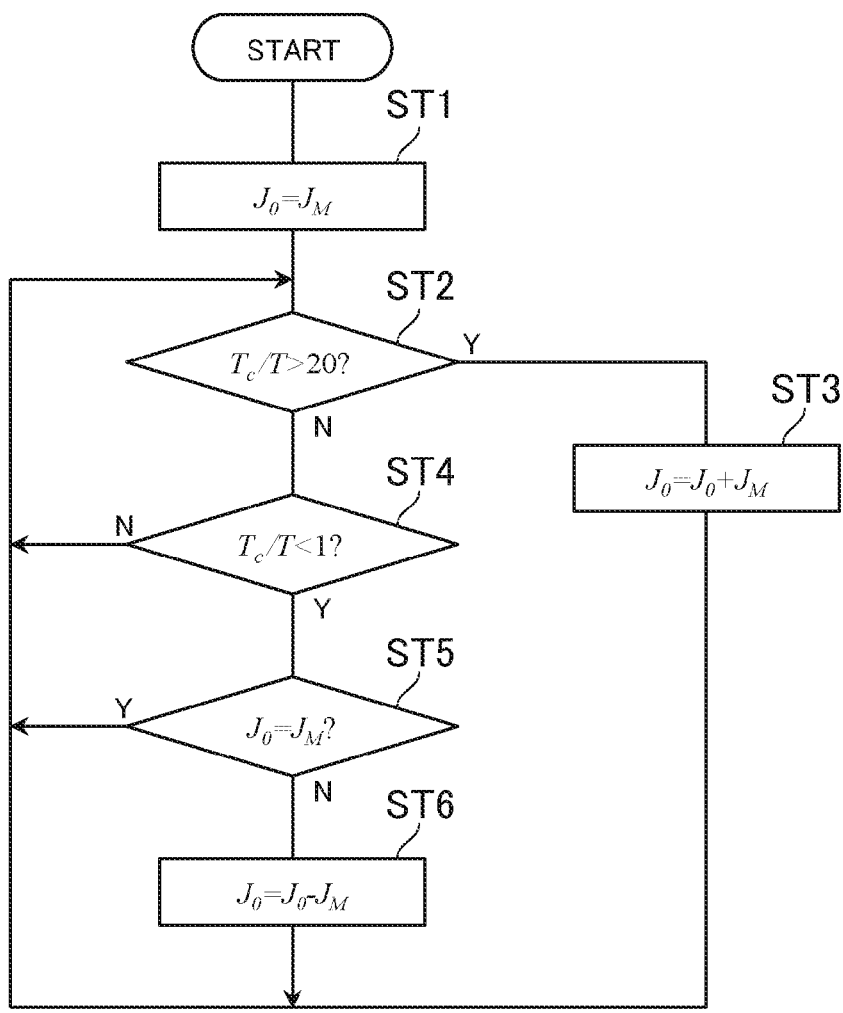
FIG. 7 is a flowchart for illustrating an operation of a moment-of-inertia value change unit 8.

FIG. 7 is a flowchart for illustrating an operation of the moment-of-inertia value change unit 8 described above. When the motor control device 100 starts the operation, in Step ST1, the moment-of-inertia value change unit 8 first sets the predetermined initial value, on this occasion, the moment of inertia $J_M$ of the motor, to the moment-of-inertia value $J_0$ used in the torque command calculation unit 4.

Then, in Step ST2, the moment-of-inertia value change unit 8 determines whether or not the value of the estimated moment-of-inertia ratio $T_c/T$ is more than 20, being the increase-time threshold ratio. When the value of the estimated moment-of-inertia ratio $T_c/T$ is more than 20, being the increase-time threshold ratio, the moment-of-inertia value change unit 8 proceeds to Step ST3, and adds the predetermined value, being the moment of inertia $J_M$ of the motor on this occasion, to the moment-of-inertia value $J_0$, thereby stepwise increasing the moment-of-inertia value $J_0$.

In Step ST2, when the value of the estimated moment-of-inertia ratio $T_c/T$ is not more than the increase-time threshold ratio, the moment-of-inertia value change unit 8 proceeds to Step ST4, and determines whether or not the value of the estimated moment-of-inertia ratio $T_c/T$ is less than 1 being the decrease-time threshold ratio. When the value of the estimated moment-of-inertia ratio $T_c/T$ is less than 1 being the decrease-time threshold ratio, the moment-of-inertia value change unit 8 further proceeds to Step ST5, and determines whether or not the moment-of-inertia value $J_0$ has already been equal to the moment of inertia $J_M$ of the motor, which is the predetermined initial value. When the moment-of-inertia value $J_0$ is not the initial value, that is, some value has been added to the moment-of-inertia value $J_0$, the moment-of-inertia value change unit 8 proceeds to Step ST6, and subtracts the predetermined value, on this occasion, the moment of inertia $J_M$ of the motor, from the moment-of-inertia value $J_0$, thereby stepwise decreasing the moment-of-inertia value $J_0$.

In any of the case where the processing in Step ST3 is finished, the case where the processing in Step ST6 is finished, the case where, in Step ST4, the value of the estimated moment-of-inertia ratio $T_c/T$ is determined not to be less than the decrease-time threshold ratio, and in the case where, in Step ST5, the moment-of-inertia value $J_0$ is determined to have already reached the predetermined initial value, the moment-of-inertia value change unit 8 returns to Step ST2. The moment-of-inertia value change unit 8 repeats the processing from Step ST2 to Step ST6 at a control cycle, thereby monitoring the value of the estimated moment-of-inertia ratio $T_c/T$.

Figure 8:
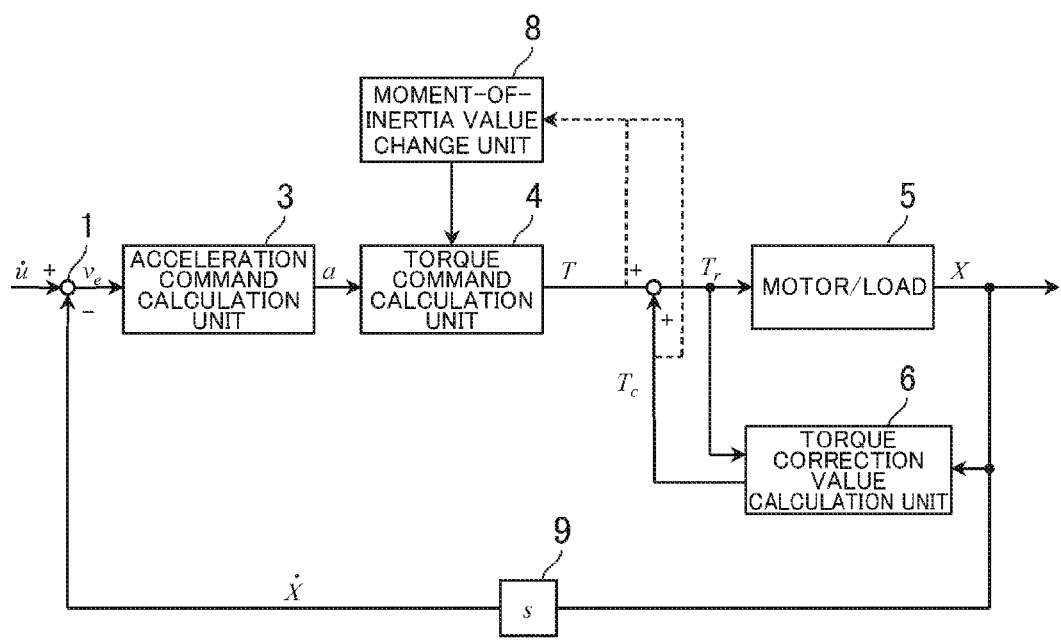
FIG. 8 is a control block diagram for illustrating the motor control device according to a second embodiment of the present invention.

FIG. 8 is a control block diagram for illustrating a motor control device 200 according to a second embodiment of the present invention. The motor control device 200 according to this embodiment is different from the motor control device 100 according to the previous embodiment in that, without providing the position feedback loop, only the speed feedback loop is provided, and the motor speed estimation unit 7 is not provided. The motor control device 200 is the same in the other points. Thus, like components are denoted by like reference numerals, and a redundant description thereof is therefore omitted.

In the motor control device 200, the speed command U is input as the command value, and the speed deviation $v_e$ being the difference from the motor speed $\dot{X}$, is acquired at the node 1. The acceleration command calculation unit 3 is configured to calculate the acceleration command a based on the speed deviation $v_e$. Moreover, the current position X acquired from the motor/load 5 is converted into the motor speed $\dot{X}$ by a differentiator 9, and is fed back to the node 1.

Also in this configuration, as in the above-mentioned motor control device 100, the moment-of-inertia value change unit 8 is configured to stepwise change the moment-of-inertia value $J_0$ used in the torque command calculation unit 4, thereby providing the stability of the control and the desired tracking performance regardless of the actual value of the moment of inertia $J_P$. The moment-of-inertia value $J_0$ is changed based on the estimated moment-of-inertia ratio $T_c/T$ also in the motor control device 200, and the operation for the change is not different.

The embodiments above are described as specific examples, and the invention disclosed in this specification is not limited to the configurations of those specific examples. Various modifications may be made by a person skilled in the art to the disclosed embodiments. For example, the shape, the number, the arrangement, or the like of the physical configurations may be changed. Moreover, the control according to the embodiments is not limited to the control achieved in the disclosed flowchart as long as the control employs an algorithm having an equivalent function. It is intended that the technical scope of the invention disclosed in this specification cover all such modifications.

In other words, it should be understood by those skilled in the art that various modifications, combinations, sub-combinations and alternations may occur depending on design requirements and other factors insofar as they are within the scope of the appended claims or the equivalents thereof.

What is claimed is:

1. A motor control device, comprising:
    an acceleration command calculation unit configured to calculate an acceleration command directed to a motor;
    a torque command calculation unit configured to calculate a torque command directed to the motor based on the acceleration command and a predetermined moment-of-inertia value;
    a torque correction value calculation unit configured to estimate disturbance of the motor based on the torque command and at least one of a motor position or a motor speed, to thereby calculate a torque correction value for the torque command; and
    a moment-of-inertia value change unit configured to change the predetermined moment-of-inertia value based on an estimated moment-of-inertia ratio, which is a ratio of the torque correction value to the torque command, wherein the moment-of-inertia value change unit is further configured to stepwise change the predetermined moment-of-inertia value based on the estimated moment-of-inertia ratio.

2. The motor control device according to claim 1, wherein a threshold for the estimated moment-of-inertia ratio when the moment-of-inertia value change unit increases the predetermined moment-of-inertia value and a threshold for the estimated moment-of-inertia ratio when the moment-of-inertia value change unit decreases the predetermined moment-of-inertia value are different from each other.

3. The motor control device according to claim 2, wherein the moment-of-inertia value change unit is configured to change the predetermined moment-of-inertia value based on a value acquired by applying a low-pass filter to the estimated moment-of-inertia ratio.

4. The motor control device according to claim 3, further comprising:
    a speed command calculation unit configured to calculate a speed command directed to the motor; and
    a motor speed estimation unit configured to estimate, based on the torque command and the motor position, an estimated motor speed to be input to the acceleration command calculation unit.

5. The motor control device according to claim 2, further comprising:
    a speed command calculation unit configured to calculate a speed command directed to the motor; and
    a motor speed estimation unit configured to estimate, based on the torque command and the motor position, an estimated motor speed to be input to the acceleration command calculation unit.

6. The motor control device according to claim 1, wherein the moment-of-inertia value change unit is configured to change the predetermined moment-of-inertia value based on a value acquired by applying a low-pass filter to the estimated moment-of-inertia ratio.

7. The motor control device according to claim 6, further comprising:
    a speed command calculation unit configured to calculate a speed command directed to the motor; and
    a motor speed estimation unit configured to estimate, based on the torque command and the motor position, an estimated motor speed to be input to the acceleration command calculation unit.

8. The motor control device according to claim 1, further comprising:
    a speed command calculation unit configured to calculate a speed command directed to the motor; and
    a motor speed estimation unit configured to estimate, based on the torque command and the motor position, an estimated motor speed to be input to the acceleration command calculation unit.

9. The motor control device according to claim 1, further comprising:
    a speed command calculation unit configured to calculate a speed command directed to the motor; and
    a motor speed estimation unit configured to estimate, based on the torque command and the motor position, an estimated motor speed to be input to the acceleration command calculation unit.

10. A motor control device, comprising:
    acceleration command calculation means for calculating an acceleration command directed to a motor;
    torque command calculation means for calculating a torque command directed to the motor based on the acceleration command and a predetermined moment-of-inertia value;
    torque correction value calculation means for estimating disturbance of the motor based on the torque command and at least one of a motor position or a motor speed, to thereby calculate a torque correction value for the torque command; and
    moment-of-inertia value change means for changing the predetermined moment-of-inertia value based on an estimated moment-of-inertia ratio, which is a ratio of the torque correction value to the torque command, and the moment-of-inertia value change means is further configured to stepwise change the predetermined moment-of-inertia value based on the estimated moment-of-inertia ratio.

11. A motor control method, comprising:
    calculating an acceleration command directed to a motor;

calculating a torque command directed to the motor based on the acceleration command and a predetermined moment-of-inertia value;
estimating disturbance of the motor based on the torque command and at least one of a motor position or a motor speed, thereby calculating a torque correction value for the torque command;
changing the predetermined moment-of-inertia value based on an estimated moment-of-inertia ratio, which is a ratio of the torque correction value to the torque command; and
changing stepwise, the predetermined moment-of-inertia value, based on the estimated moment-of-inertia ratio.

* * * * *